United States Patent
O'Donnell et al.

(10) Patent No.: US 9,218,198 B2
(45) Date of Patent: Dec. 22, 2015

(54) METHOD AND SYSTEM FOR SPECIFYING THE LAYOUT OF COMPUTER SYSTEM RESOURCES

(71) Applicant: Oracle America, Inc., Redwood Ciry, CA (US)

(72) Inventors: Nicholas O'Donnell, Dracut, MA (US); Pallab Bhattacharya, San Jose, CA (US); Steven John Sistare, Westford, MA (US)

(73) Assignee: Oracle America, Inc., Redwood Shores, CA (US)

( * ) Notice: Subject to any disclaimer, the term of this patent is extended or adjusted under 35 U.S.C. 154(b) by 304 days.

(21) Appl. No.: 13/800,414

(22) Filed: Mar. 13, 2013

(65) Prior Publication Data

US 2014/0282504 A1 Sep. 18, 2014

(51) Int. Cl.
| | |
|---|---|
| *G06F 9/46* | (2006.01) |
| *G06F 15/177* | (2006.01) |
| *G06F 15/173* | (2006.01) |
| *G06F 9/455* | (2006.01) |
| *G06F 9/50* | (2006.01) |

(52) U.S. Cl.
CPC .......... *G06F 9/45558* (2013.01); *G06F 9/5077* (2013.01); *G06F 2009/4557* (2013.01); *G06F 2209/501* (2013.01)

(58) Field of Classification Search
None
See application file for complete search history.

(56) References Cited

U.S. PATENT DOCUMENTS

| | | | |
|---|---|---|---|
| 6,192,401 B1 * | 2/2001 | Modiri et al. | 709/220 |
| 7,996,433 B2 * | 8/2011 | Davis et al. | 707/796 |
| 8,850,442 B2 * | 9/2014 | Davis et al. | 718/104 |

* cited by examiner

*Primary Examiner* — Mengyao Zhe
*Assistant Examiner* — Bing Zhao
(74) *Attorney, Agent, or Firm* — Osha Liang LLP

(57) ABSTRACT

A method for specifying the layout of computing system resources includes receiving a request for a virtual machine, the request comprising a processor requirement and a memory requirement, gathering resource groupings, each resource grouping comprising a latency penalty between a processor and at least a memory. The method further includes calculating a proportionality for each resource grouping, wherein the proportionality comprises a minimum of: an amount of the processor requirement the resource grouping can satisfy and an amount of the memory requirement the resource grouping can satisfy, sorting the resource groupings based on at least the proportionality for each resource grouping to create an ordered list and binding, based on the ordered list, at least one resource group to the virtual machine, wherein the at least one resource group satisfies the processor requirement and the memory requirement.

20 Claims, 12 Drawing Sheets

METHOD AND SYSTEM FOR SPECIFYING THE LAYOUT OF COMPUTER SYSTEM RESOURCES

BACKGROUND

Virtual machines are ever increasing in their popularity. These virtual systems are used by many different entities for many different purposes, and there are many competing implementations. Typically, virtual machines execute on shared hardware. When multiple virtual machines are deployed on shared hardware, the shared hardware is manually assigned to each of the virtual machines in advance. As the size and complexity of the underlying shared hardware increases, the difficulty of manually assigning system resources to virtual machines increases greatly.

SUMMARY

In general, in one aspect, the invention relates to a method for specifying a layout of a computing system resources. The method comprises receiving, by a computer processor, a request for a virtual machine, the request comprising a processor requirement and a memory requirement; gathering, by the computer processor, a plurality of resource groupings each resource grouping of the plurality of resource grouping comprising a latency penalty between a first processor of a plurality of processors and at least a first memory of a plurality of memories; calculating, by the computer processor, a proportionality for each resource grouping of the plurality of resource groupings, wherein the proportionality comprises a minimum of: a first amount of the processor requirement the resource grouping can satisfy and a second amount of the memory requirement the resource grouping can satisfy; sorting, by the computer processor, the plurality of resource groupings based on at least the proportionality for each resource grouping to create a first ordered list; and binding, by the computer processor and based on the first ordered list, at least one resource group of the plurality of resource groupings to the virtual machine, wherein the at least one resource group satisfies the processor requirement and the memory requirement.

In general, in one aspect, the invention relates to a non-transitory computer-readable medium (CRM) storing a plurality of instructions for specifying a layout of a computing system resources. The plurality of instructions comprise functionality for: receiving a request for a virtual machine, the request comprising a processor requirement and a memory requirement; gathering a plurality of resource groupings each resource grouping of the plurality of resource grouping comprising a latency penalty between a first processor of a plurality of processors and at least a first memory of a plurality of memories; calculating a proportionality for each resource grouping of the plurality of resource groupings, wherein the proportionality comprises a minimum of: a first amount of the processor requirement the resource grouping can satisfy and a second amount of the memory requirement the resource grouping can satisfy; sorting the plurality of resource groupings based on at least the proportionality for each resource grouping to create a first ordered list; and binding, based on the first ordered list, at least one resource group of the plurality of resource groupings to the virtual machine, wherein the at least one resource group satisfies the processor requirement and the memory requirement.

In general, in one aspect, the invention relates to a system for specifying a layout of a computing system resources. The system comprises: a computing system comprising a plurality of processors and a plurality of memories, the computing system configured for: receiving a request for a virtual machine, the request comprising a processor requirement and a memory requirement; gathering a plurality of resource groupings each resource grouping of the plurality of resource grouping comprising a latency penalty between a first processor of a plurality of processors and at least a first memory of a plurality of memories; calculating a proportionality for each resource grouping of the plurality of resource groupings, wherein the proportionality comprises a minimum of: a first amount of the processor requirement the resource grouping can satisfy and a second amount of the memory requirement the resource grouping can satisfy; sorting the plurality of resource groupings based on at least the proportionality for each resource grouping to create a first ordered list; and binding, based on the first ordered list, at least one resource group of the plurality of resource groupings to the virtual machine, wherein the at least one resource group satisfies the processor requirement and the memory requirement.

Other aspects of the invention will be apparent from the following description and the appended claims.

DETAILED DESCRIPTION

Figure 1A:
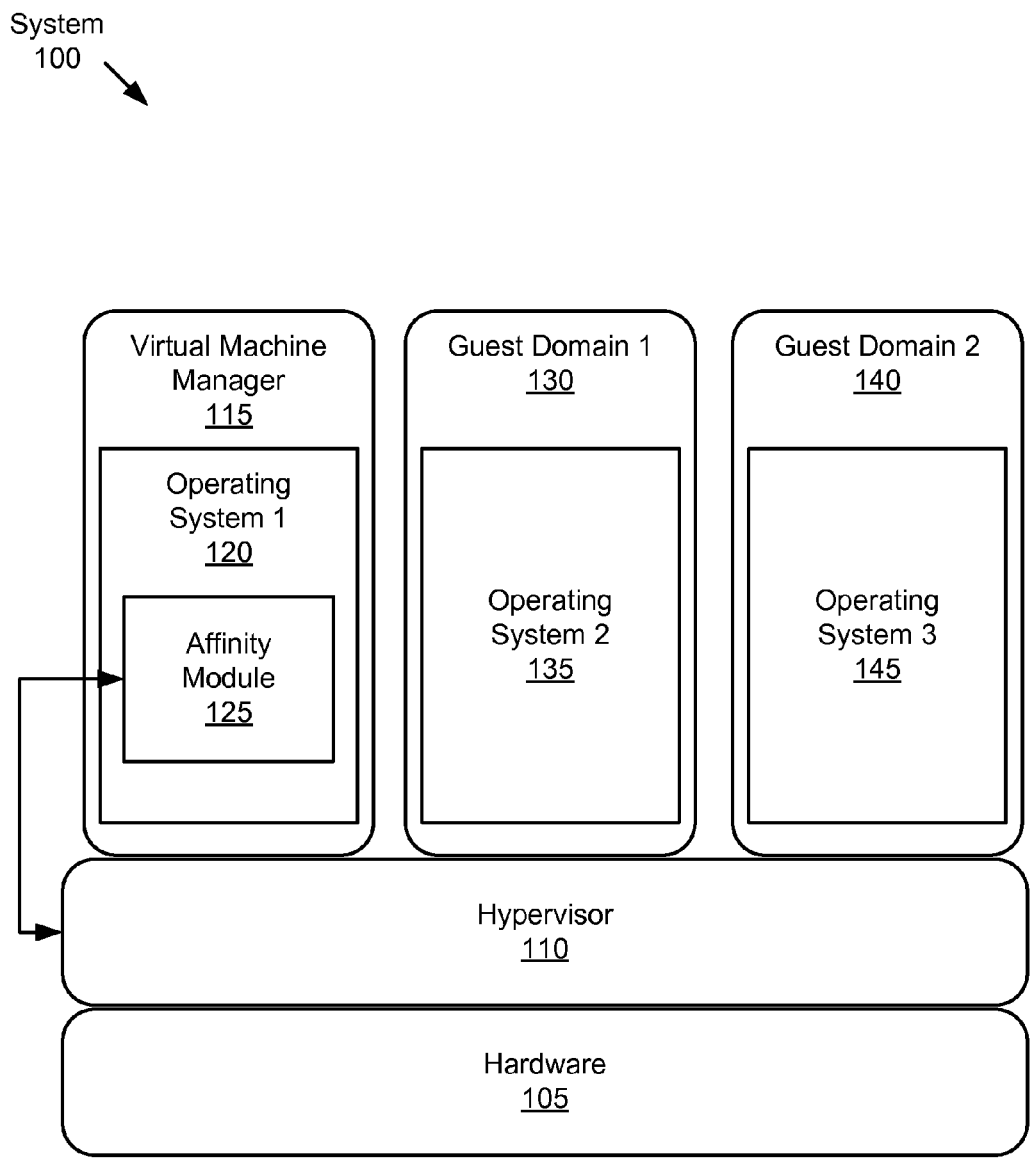
FIGS. 1A and 1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for specifying the layout of computer system resources. Specifically, after receiving a request for adding resources, removing resources, or creating a new virtual machine, resource groupings are gathered and a proportionality is calculated for each resource grouping. The resource groups are sorted in a list based on the proportionality and, according to the sorted list, the resource are added, removed, or bound to the virtual machine(s).

FIG. 1A shows a diagram of a high-level view of a system for specifying the layout of computing system resources. System (100) includes Hardware (105), Hypervisor (110), Virtual Machine Manager (115), Operating System 1 (120), Affinity Module (125), Guest Domain 1 (130), Operating System 2 (135), Guest Domain 2 (140), and Operating System 3 (145). Hardware (105) is physical computing system hardware including, but not limited to: Central Processing Units (CPUs), storage (e.g., memory, hard drives, etc.), Network Interface Cards (NIC), buses (e.g., motherboards, CPU boards, etc.), devices connecting to CPU or memory resources, input devices, output devices, and/or any other physical component of a computing system. Hardware (105) is addressed in more detail in FIG. 1B.

Figure 1B:
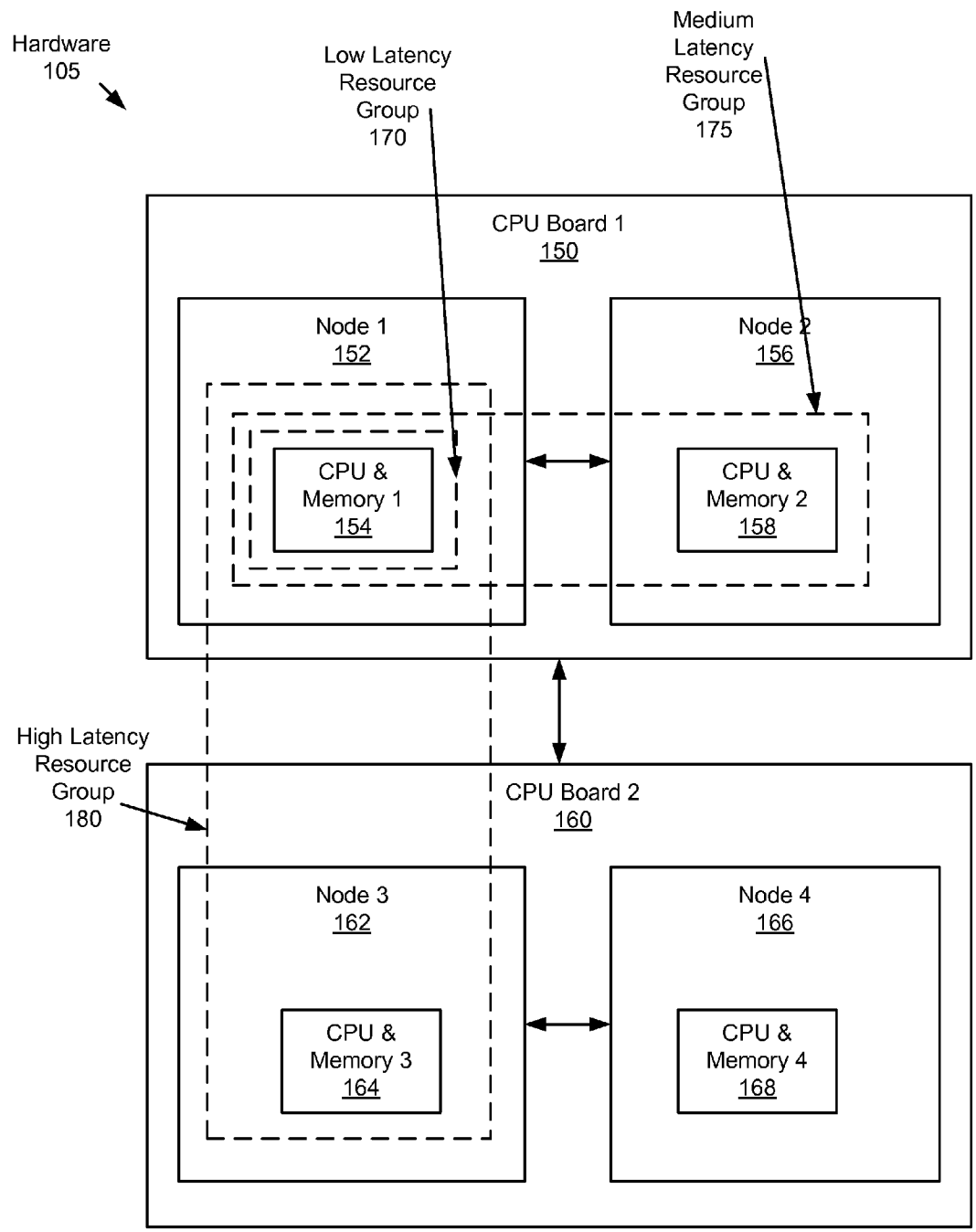

In FIG. 1B, Hardware (105) is shown in detail. Specifically, Hardware (105) includes CPU Board 1 (150), Node 1 (152), CPU & Memory 1 (154), Node 2 (156), CPU & Memory 2 (158), CPU Board 2 (160), Node 3 (162), CPU & Memory 3 (164), Node 4 (166), CPU & Memory 4 (168), Low Latency Resource Group (170), Medium latency Resource Group (175), and High Latency Resource Group (180). For the purposes of explanation, FIG. 1B has been simplified, and many typical components have been left off. Further, FIG. 1B has also been reduced in terms of the number of components shown. In other words, Hardware (105) may include any number of CPUs, memories, and other components. It will be apparent to one of ordinary skill in the art that hardware (105) may come in an unlimited number of configurations and as such, should not be limited to the configuration shown in FIG. 1B.

In one or more embodiments of the invention, CPU Board 1 (150) and CPU Board 2 (160) are physical circuit boards on which CPUs and memories, among other components, are located. CPU Board 1 (150) and CPU Board 2 (160) may include any number of CPUs, memories, and/or other components. In FIG. 1B, CPU Board 1 (150) and CPU Board 2 (160) each include 2 nodes: CPU Board 1 (150) includes Node 1 (152) and Node 2 (156), while CPU Board 2 (160) includes Node 3 (162) and Node 4 (166). In one or more embodiments of the invention, CPU Board 1 (150) and CPU Board 2 (160) are communicatively connected to each other.

In one or more embodiments of the invention, Node 1 (152), Node 2 (156), Node 3 (162), and Node 4 (166) are locations on circuit boards (i.e., CPU Board 1 (150) and CPU Board 2 (160)) where CPUs and/or memory reside (i.e., CPU & Memory 1 (154), CPU & Memory 2 (158), CPU & Memory 3 (164), CPU & Memory 4 (168)). Any number of CPUs and any number or amount of memory may be located within a given node. Further, there may be any number of nodes within a CPU board, and the invention should not be limited to the configuration shown in FIG. 1B. In one or more embodiments of the invention, all nodes are identical. Alternatively, nodes may have differing amounts and/or speeds of CPUs and/or memories. In one or more embodiments of the invention, the memory within a node is a shared main memory used by all CPUs within the node. Alternatively, the memory may be many separate, dedicated memories. Further still, some combination of a shared main memory or dedicated memory may be used. In one or more embodiments of the invention, the memories of a node are accessible by a CPU of a different node.

In one or more embodiments of the invention, CPU & Memory 1 (154), CPU & Memory 2 (158), CPU & Memory 3 (164), CPU & Memory 4 (168) are computer processors and memories within a node (i.e., Node 1 (152), Node 2 (156), Node 3 (162), and Node 4 (166)). As described above, the CPUs may be identical, or may have different specifications, such as processor speeds. Likewise, the memories may be identical, or may have different specifications, such as amount or speed. The CPUs and memories are depicted as one unit in FIG. 1B for the sake simplicity, but in actuality they may be separate, and the invention should not be limited to the configuration shown in FIG. 1B. In one or more embodiments of the invention, each CPU and memory (i.e., CPU & Memory 1 (154), CPU & Memory 2 (158), CPU & Memory 3 (164), CPU & Memory 4 (168)) are communicatively connected with each other, directly or indirectly, via the CPU board (i.e., CPU Board 1 (150) and CPU Board 2 (160)) on which they are mounted. Further, each CPU depicted in FIG. 1B may contain multiple cores and/or may be comprised of multiple CPUs. In other words, each node (i.e., Node 1 (152), Node 2 (156), Node 3 (162), and Node 4 (166)) may contain any number of CPUs, any number of cores, and any number or amount of memories. It will be apparent to one of ordinary skill in the art that the CPUs and memories may be configured many different ways, and may be made of many different components and, as such, the invention should not be limited to the above examples.

In one or more embodiments of the invention, each of the various CPUs and memories (i.e., CPU & Memory 1 (154), CPU & Memory 2 (158), CPU & Memory 3 (164), CPU & Memory 4 (168)) of the system are members of one or more resource groupings. A resource group is a relationship of a single CPU or group of CPUs accessing a range of memory for some latency penalty. A latency penalty is the amount of time taken for a given CPU to access data stored on a given memory. Typically, the farther apart a CPU and a memory, the larger the latency penalty. Specifically, the CPUs of the system are used to define the resource groupings. Optionally, the memories of the system may be used to define the resource groupings. Alternatively, or in addition to the above described embodiments, a resource group may include, or be defined by, any other component of a computing system including, but not limited to: storage devices (e.g., hard drives, etc.), Network Interface Cards (NIC), buses (e.g., motherboards, CPU boards, etc.), devices connecting to CPU or memory resources, input devices, output devices, etc. In one or more embodiments of the invention, each CPU of the system is a member of multiple resource groupings and is grouped with many different memories. Alternatively, each CPU may be a member of one resource grouping. In one or more embodiments of the invention, there are three categories of resource groupings: a low latency group, a medium latency group, and a high latency group. Alternatively, there may be more than three resource groupings, or less than three. For the sake of simplicity, FIG. 1B only shows the resource groupings for the CPUs of CPU & Memory 1 (154), and the invention should not be limited to the groupings shown in FIG. 1B.

FIG. 1B shows three resource groupings: Low Latency Resource Group (170), Medium Latency Resource Group (175), and High Latency Resource Group (180). In one or more embodiments of the invention, Low Latency Resource Group (170) is for any CPU and memory combination(s) where the CPU is accessing memory within the same node where the CPU is located. Thus, Low Latency Resource Group (170) includes the CPUs and memories of CPU & Memory 1 (154). This is not an exhaustive listing of the members of Low Latency Resource Group (170), and the invention should not be limited to the above example.

In one or more embodiments of the invention, Medium Latency Resource Group (175) is for any CPU and memory combination(s) where the CPU is accessing memory located on the same CPU board, but residing on different nodes. Thus, Medium Latency Resource Group (175) includes the CPUs of CPU & Memory 1 (154) and the memories of CPU & Memory 2 (158). Likewise, the reverse is true: the CPUs of CPU & Memory 2 (158) accessing the memory of CPU & Memory 1 (154) would also be members of Medium Latency Resource Group (175). This is not an exhaustive listing of the members of Medium Latency Resource Group (175), and the invention should not be limited to the above examples.

In one or more embodiments of the invention, High Latency Resource Group (180) is for any CPU and memory combination(s) where the CPU is accessing memory located on a different CPU board. Thus, High Latency Resource Group (180) includes the CPUs of CPU & Memory 1 (154) and the memory of CPU & Memory 3 (164). Further, High Latency Resource Group (180) would also include the CPUs of CPU & Memory 1 (154) and the memory of CPU & Memory 4 (168), although this is not shown in FIG. 1B for the sake of simplicity. This is not an exhaustive listing of the members of High Latency Resource Group (180), and the invention should not be limited to the above examples.

In one or more embodiments of the invention, there is a range of latencies within a given resource group. That is, two CPUs and their associated memories may have different latency times (i.e., 50 nanoseconds and 80 nanoseconds) and yet both CPUs would still be in the same resource group (i.e., the low latency resource group). The range of latencies for a resource group may be established at any time, and may be of any amount. It will be apparent to one of ordinary skill in the art that there are many ranges which a resource group may occupy and, as such, the invention should not be limited to the above examples.

In one or more embodiments of the invention, an important aspect of specifying the layout of computer system resources is the concept of proportional percentage. The proportional percentage is the minimum of: the percentage of a CPU requirement and a memory requirement that may be satisfied by a given resource group. For example, a customer (i.e., the administrator of the computer system, a $3^{rd}$ party requesting that the computing system perform some task(s), etc.) requests a new virtual machine with a resource requirement of 4 CPUs and 20 GB of memory, and there are three resource groups available: group1 has 2 CPUs available and 40 GB of memory; group2 has 8 CPUs available and 2 GB of memory; and group3 has 10 CPUS and 100 GB of memory available. Group 1 is able to satisfy 50% of the CPU requirement (2 CPUs free, and 4 needed) and 100% of the memory requirement (40 GB free, and 20 GB needed). Thus, the proportional percentage of group1 is 50% (the minimum of 50% and 100%). Likewise, group2 is able to satisfy 100% of the CPU requirement (8 CPUs free, 4 needed) and 10% of the memory requirement (20 GB needed, and 2 GB free). Thus, the proportional percentage of group2 is 10%. To complete the example, the proportional percentage of group3 is 100%, because group3 is able to fully satisfy both the CPU and memory requirements of the new virtual machine.

Returning to FIG. 1A, in one or more embodiments of the invention, Hypervisor (110) is a software application that provides operating systems with a virtual operating platform. In other words, Hypervisor (110) is the interface between the hardware and the virtual machines. Hypervisor (110) is typically transparent to virtual machines operating on Hardware (105), except for Virtual Machine Manager (115).

In one or more embodiments of the invention, Virtual Machine Manager (115) is aware of Hypervisor (110), and is able to communicate with Hypervisor (110) for the purposes of altering virtual machines or creating new virtual machines Virtual Machine Manager (115) has resources (i.e., CPUs and memory) from Hardware (105) allocated to it, and Virtual Machine Manager (115) is also aware of the amount of resources of Hardware (105) that are currently unassigned to virtual machines Operating System 1 (120) executes on the resources assigned to Virtual Machine Manager (115). Operating System 1 (120) may be any operating system now known or later developed, and need not be the same as the other operating systems running on different virtual machines also executing on Hardware (105) (e.g., Operating System 2 (135) and Operating System 3 (145)).

In one or more embodiments, Affinity Module (125) is a module or application executing within Operating System 1 (120), and is responsible for automating the assignment of free resources to new virtual machines, and adding or subtracting resources to pre-existing virtual machines Affinity Module (125) may operate without human intervention. In other words, a customer may request a virtual machine with a set of resource requirements, and Affinity Module (125) is able to bind free resources from Hardware (105) to the requested virtual machine without administrator interference. Alternatively, an administrator may be required to perform some portion of the tasks, or may optionally do so. In one or more embodiments of the invention, if the virtual machine is already running, Affinity Module (125) is able to add, or remove, one resource at a time (i.e., CPUs or memory), rather than both. Alternatively, Affinity Module (125) is able to add CPUs and memory to a running virtual machine at the same time.

In one or more embodiments of the invention, Affinity Module (125) attempts to distribute resources to new or running virtual machines following four general principles: (i) attempt to allocate resources so that CPU strands access some memory range with the lowest latency possible; (ii) attempt to allocate resources using the minimum number of resource groups possible; (iii) where CPU strands can access memory from higher latencies, then the latencies between CPU strands accessing remote memory ranges will be the lowest latencies possible; and (iv) pack resource groups where possible to maximize the use of resources before resorting to using additional resource groups that might have a higher latency. The specific details of how Affinity Module (125) accomplishes these principles are discussed in detail below, in FIGS. 2A-2E. It will be apparent to one of ordinary skill in the art that there are many ways to implement the principles and responsibilities of Affinity Module (125) and, as such, the invention should not be limited to the above examples.

In one or more embodiments of the invention, Guest Domain 1 (130) and Guest Domain 2 (140) are virtual machines Guest Domain 1 (130) and Guest Domain 2 (140) are completely independent of, and unaware of, each other. Guest Domain 1 (130) and Guest Domain 2 (140) each have resources assigned specifically for their use, and the resources may be of any amount up to the system maximum. Optionally, some resources may be shared between Guest Domain 1 (130) and Guest Domain 2 (140). In one or more embodiments of the invention, Guest Domain 1 (130) and Guest Domain 2 (140) have Operating System 2 (135) and Operating System 3 (145), respectively, executing within them. Operating System 2 (135) and Operating System 3 (145) are any operating systems now known or later developed, and need not be the same operating system. Alternatively, Operating System 2 (135) and Operating System 3 (145) may be the same operating system.

FIGS. 2A-2E show flowcharts of a method for specifying the layout of computer system resources. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2A-2E should not be construed as limiting the scope of the invention.

Figure 2A:
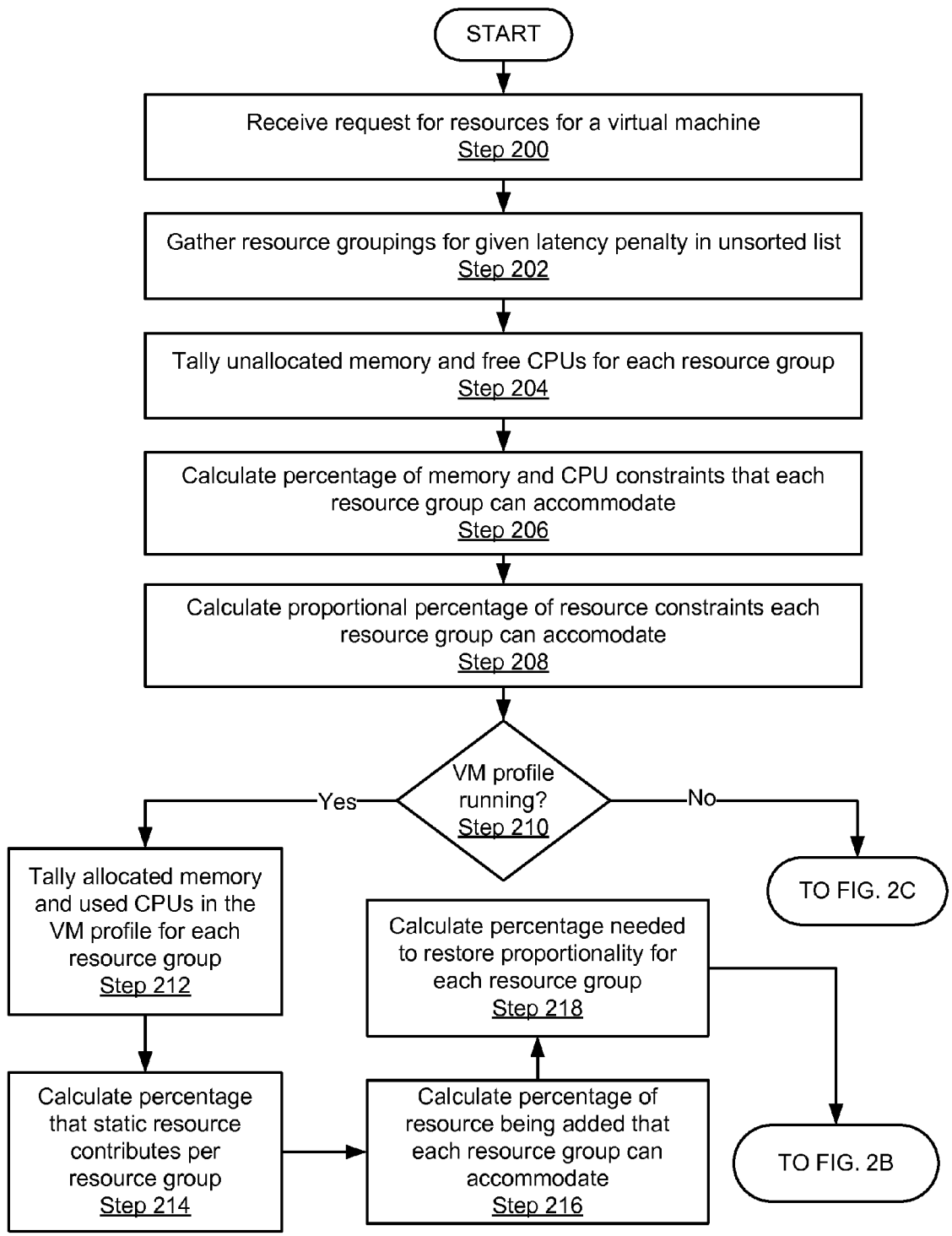
FIGS. 2A-2E show flowcharts of a method in accordance with one or more embodiments of the invention.

The method begins in FIG. 2A, with Step 200. In Step 200, a request for resources for a virtual machine is received. The request may be received in any manner now known or later developed. Specifically, the request may indicate how many CPUs and/or how much memory to allocate to the virtual machine. In one or more embodiments of the invention, the request is for a new virtual machine. Alternatively, the request is for a pre-existing virtual machine, and may be increasing or decreasing the resources associated with the virtual machine.

In Step 202, resource groupings are gathered for a given latency penalty in an unsorted list. The resource groupings may be organized in any fashion. The resource groupings may be defined by CPUs, by memory, or by any suitable method. In one or more embodiments of the invention, the resource groupings include a low, medium, and high latency group. For example, the low group may be for CPU and memory on the same node, the medium group may be for CPU and memory on the same processor board but different nodes, and the high group may be for CPU and memory on different processor boards. Within any given group, there may be many different combinations of CPUs and memories, and the same CPU or memory may appear in the same resource group multiple times. Alternatively, there may be more than, or less than, three resource groupings, and the resource groupings may be defined in any manner. It will be apparent to one of ordinary skill in the art that there are many ways to establish and/or define resource groupings and, as such, the invention should not be limited to the above examples. Further, the resource groupings may be gathered in any manner now known or later developed. In one or more embodiments of the invention, a hypervisor is responsible for gathering the data needed for determining the resource groupings. Step 202 may be performed simultaneously for all resource groups. Alternatively, Step 202 may be performed for a single resource group at a time. Then, if there are insufficient resources at the given resource group, Step 202 would be performed a second time, as would the entire method, with a different (i.e., slower) resource group. It will be apparent to one of ordinary skill in the art that Step 202 may be performed in many different ways and at many different times and, as such, the invention should not be limited to the above examples.

In Step 204, unallocated memory and free CPUs for each resource group are tallied. The unallocated memory and free CPUs may be tallied in any method now known or later developed.

In Step 206, the percentage of memory and CPU constraints that each resource group can accommodate is calculated. The calculation may be a comparison of the resources available in the group(s) to the requirements of the virtual machine. Optionally, any other method now known or later developed may be used.

In Step 208, the proportional percentage of resource constraints each resource group can accommodate is calculated. As discussed above, the proportional percentage is the minimum of: the percentage of the required memory and the percentage of the required CPUs that the resource group(s) can accommodate. The proportional percentage may be calculated in any manner now known or later developed.

In Step 210, it is determined if the virtual machine is already running. The request in Step 200 may optionally specify if the virtual machine is already running or not, and thus, this Step may be optional. If the virtual machine is already running, the method proceeds to Step 212. If the virtual machine is not already running, then the method proceeds to Step 232 of FIG. 2C.

In Step 212, allocated memory and CPUs in the profile of the running virtual machine are tallied for each resource group. As in Step 204, the allocated resources may be tallied in any manner now known or later developed.

In Step 214, the percentage that the static resource contributes per resource group is calculated using the tallied values. The static resource in an add operation for a running virtual machine is the resource which is not being increased. When adding resources to a running virtual machine, it is assumed that the percentage level of the static resource per resource group is the correct proportional percentage, and the addition will attempt to restore and/or maintain the balance of the resource being added. For example, for a virtual machine having two resource groups bound to it, resource group A provides 2 CPUs and 6 GB of memory, while group B provides 2 CPUs and 4 GB of memory. If the customer wants to subsequently add 2 GB of memory to the virtual machine, the 2 GB of memory will be added to group B. This is because the static resource (CPUs) have a proportionality of 50%, and adding 2 GB to group B would restore 50% proportionality to the memory (6 GB=(4 GB+2 GB)). The percentage that the static resource contributes per resource group may be calculated in any manner now known or later developed.

In Step 216, the percentage of the resource being added that each resource group can accommodate is calculated using the tallied values. The percentage may be calculated, for example, by comparing the free resource(s) of each resource group to the resource addition requested by a customer. Alternatively, any other method may be used to calculate the percentage.

In Step 218, the percentage needed to restore proportionality for each resource group is calculated. The percentage may be calculated, for example, by determining the total amount of the resource being added that the virtual machine will have and determining the "correct" amount of the resource being added that each resource group should have based on the proportionality of the static resource. Then, the proper amount of the resource being added may be distributed to the resource groups that are not proportional. Alternatively, the percentage may be calculated using any method now known or later developed. After Step 218, the method proceeds to FIG. 2B.

Figure 2B:
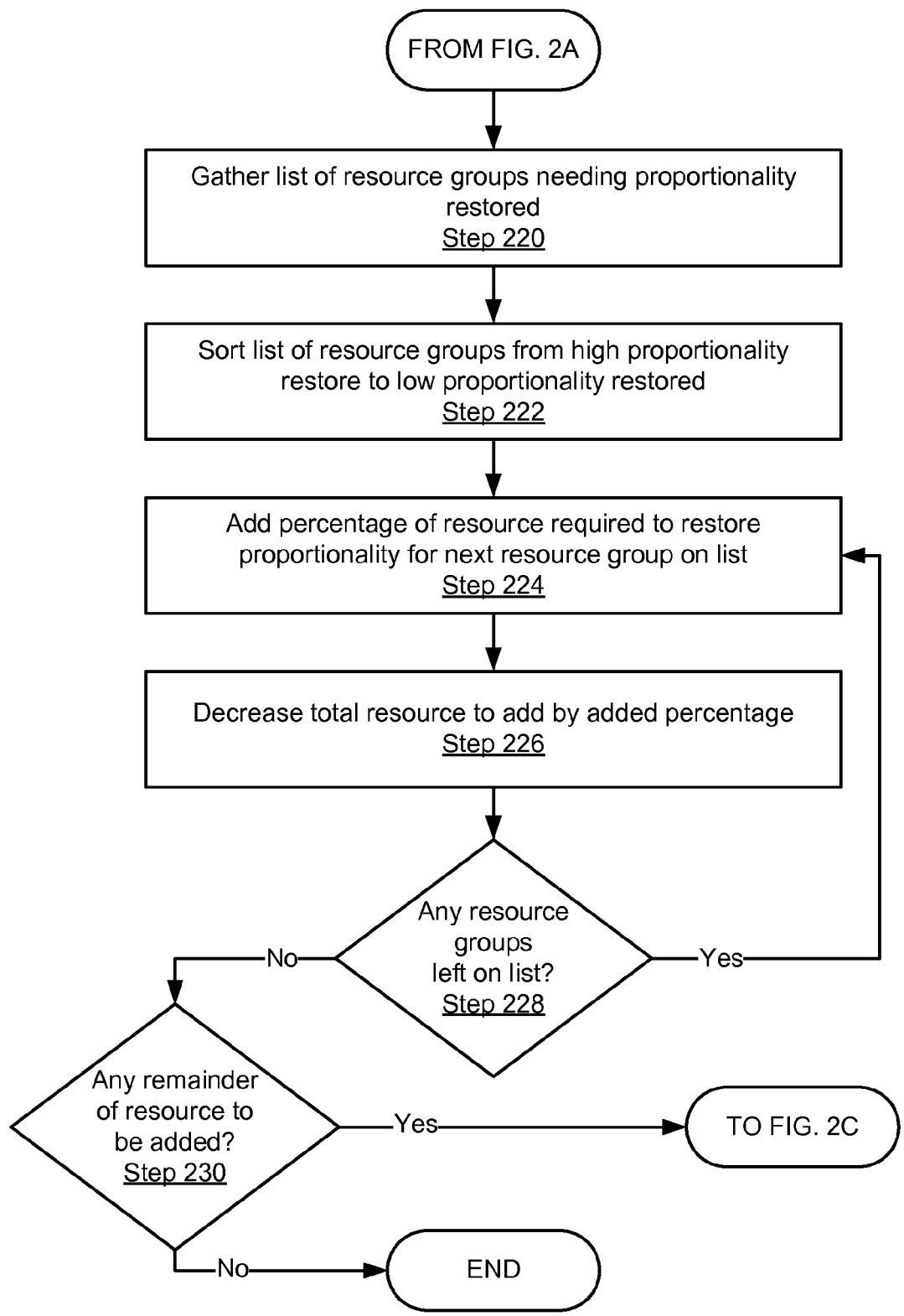

FIG. 2B shows a continuation of the method described in FIG. 2A. However, FIG. 2B is only performed when the resource request is for an add resource operation on a virtual machine that is already running, and is not performed if the request is for a new virtual machine. In Step 220, a list of resource groups needing proportionality restored is gathered. A resource group needs proportionality restored when the proportional percentage of the static resource does not match the proportional percentage of the resource being added. The list may be constructed from the calculations of the prior steps, and may be assembled in any manner now known or later developed.

In Step 222, the list of resource groups is sorted from high proportionality restore to low proportionality. The list may be sorted in any method now known or later developed.

In Step 224, the percentage of the resource needed to restore proportionality is added to the virtual machine for the next resource group on the list. Specifically, as explained in Step 214, the proportionality of the resource being added is attempted to be brought consistent with the static resource. Step 224 and 226 may be performed as many times as necessary to restore proportionality to the resource groups currently being used by a virtual machine. The resource may be added to the virtual machine in any manner now known or later developed.

In Step 226, the total resource to be added to the virtual machine is reduced by the amount added in Step 224. The resource to be added may be tracked and/or reduced in any manner now known or later developed.

In Step 228, a determination is made whether there are any resource groups left on the sorted list. Specifically, if there are resources left on the list, that means that there are additional resource groups that need their proportionality restored and the method returns back to Step 224. If there are no additional resource groups on the list, then the method proceeds to Step 230.

In Step 230, a determination is made whether the resource requirement has been satisfied. In other words, a determination is made if the virtual machine has received all of the additional resource that the customer requested. If all of the requested resources have been added, then the method ends. If there are still additional resource requirements to be met, then the invention proceeds to Step 232 of FIG. 2C.

Figure 2C:
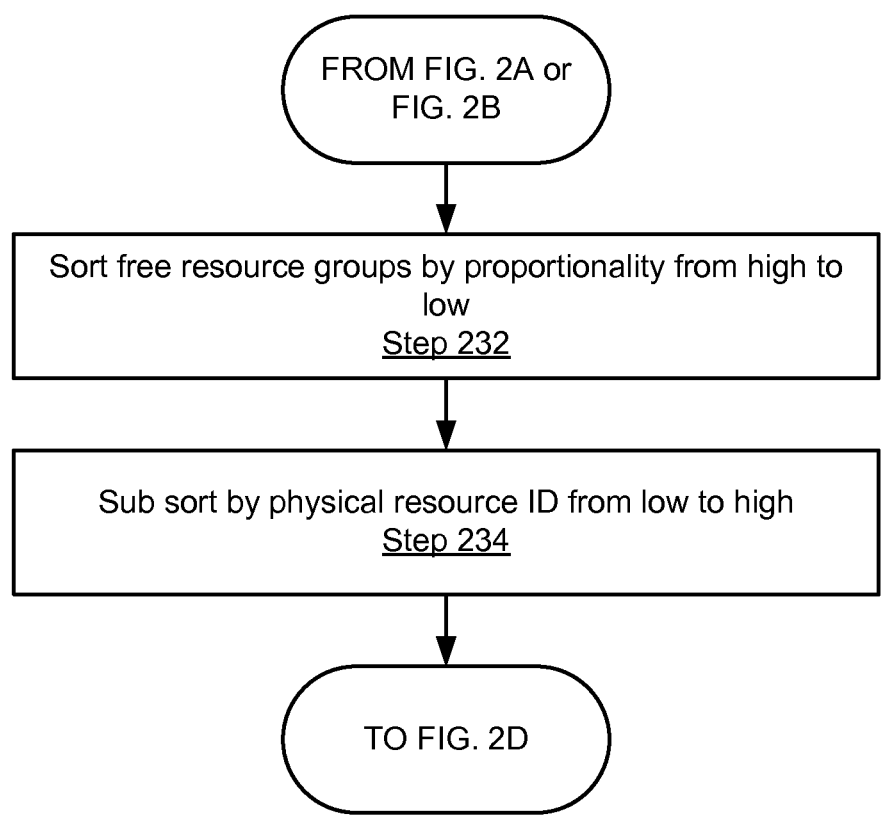

Turning to FIG. 2C, in Step 232, the free resource groups are sorted by proportionality from high to low. For example, if a customer requests a virtual machine with 10 CPUs and 10 GB memory, and there are three resource groups: group1 with 5 CPUs and 50 GB memory (50% proportionality), group2 with 4 CPUs and 4 GB memory (40% proportionality), and group3 with 10 CPUs and 6 GB memory (60% proportionality), then the list will be ordered: group3 (60%), then group1 (50%), and lastly group2 (40%). The resource groups may be sorted in any manner now known or later developed. In one or more embodiments of the invention, the resource groups are sorted in this order because, by prioritizing the resource groups with the highest proportionality, the virtual machine's resource requirements may be satisfied by the fewest possible resource groups and in the most efficient way.

In Step 234, the sorted list is sub-sorted by the physical resource ID from low to high. For example, each CPU has a physical ID (i.e., CPU0, CPU1, CPU2, etc), and this value is used to sub-sort the physical resources. The list is sub-sorted in this manner for the purposes of tie-breaking amongst equal proportionality resource groups. Additionally, when a system uses the method of the invention, this ensures that the resources are assigned out in a roughly sequential order, which may assist in tightly packing resources and ensuring that the resources may be utilized to their fullest extent. After Step 234, the method continues to FIG. 2D, and Step 236.

Figure 2D:
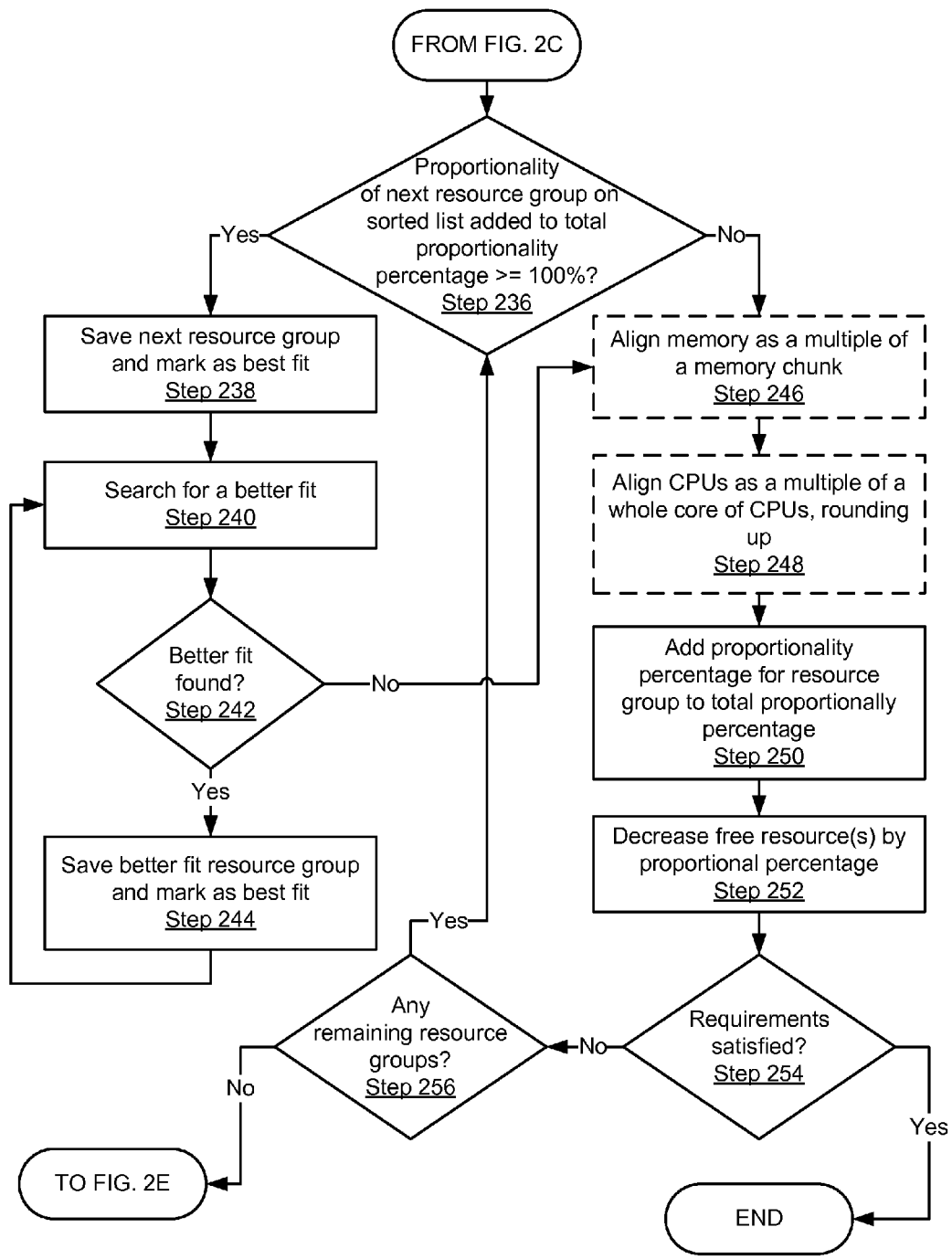

Turning to FIG. 2D, in Step 236, it is determined if the proportionality of the next resource group on the sorted list, when added to the total amount of resources bound to the virtual machine, increases the total percentage of requested resources over 100%. In other words, it is determined if the next resource group on the sorted list has enough available resources to satisfy the (remaining) resource requirement(s) for the virtual machine. For example, if a customer requested a virtual machine with 10 CPUs and 10 GB memory, of which 5 CPUs and 5 GB of memory have already been bound, then any resource group with a proportionality of 50% or higher (i.e., a resource group with 5 or more CPUs and 5 GB or more memory) would increase the total percentage of requested resources to 100% (i.e., 10 CPU and 10 GB memory) or higher. If the next resource group does not have enough resources, then the method proceeds to Step 246. If the next resource group does have enough, or more than enough, resources then the method proceeds to Step 238.

In Step 238, the next resource group is saved and marked as the best fit. The best fit occurs when the resource that will be bound to the virtual machine is the closest possible fit to the (remaining) resources needed by the virtual machine That is, the best fit is the resource group with the least amount of excess resources when satisfying the requested virtual machine's remaining needs. The next resource group may be saved and/or marked in any manner now known or later developed.

In Step 240, a better fit is searched for. A better fit may be searched for in any manner now known or later developed. Specifically, in one or more embodiments of the invention, searching for a better fit involves iterating through the sorted list and determining if any resource groups of the same latency penalty also satisfy all the resource needs of the virtual machine, but have less excess resources (i.e., the total proportionality is lower than the current best fit). It will be apparent to one of ordinary skill in the art that there are many ways to search for a better fit and, as such, the invention should not be limited to the above examples.

In Step 242, it is determined if a better fit was found, in accordance with one or more embodiments of the invention. A better fit is a resource group that has fewer excess resources than the currently marked best fit, described above in Step 238. If a better fit was not found, the method proceeds to Step 246. Alternatively, if a better fit was found, then the method proceeds to Step 244.

In Step 244, the better fit resource group is saved and marked as the best fit. As in Step 238, the better fit may be marked and saved in any manner now known or later developed. Next the method returns to Step 240, to search again for a better fit.

In Step 246, memory is allocated as a multiple of a memory chunk. Step 246 is an approximation. Specifically, memory may be aligned as a multiple of memory chunk(s) to ensure that the management of memory is simplified. For example, a chunk may be 256 MB. Any instances of remainders less than a 256 MB chunk are limited to either 0 or 1 instance across the entire system. The allocating and/or binding of memory may be performed in any manner now known or later developed.

In Step 248, CPUs are allocated as a multiple of a whole core of CPUs. Step 248 is an approximation. Specifically, CPUs may be aligned as entire cores, rather than sharing cores, to ensure maximum efficiency. Any instances of allocating less than an entire core are limited to 0 or 1 instance across the entire system. If only a portion of a core is required, the amount needed may be rounded up to a whole core, as needed. The allocating and/or binding of CPUs may be performed in any manner now known or later developed.

In Step 250, the proportionality percentage for the resource group just added to the virtual machine is added to the total proportionality of the virtual machine. The addition may be performed in any manner now known or later developed.

In Step 252, the free resources of the system are decreased by the proportional percentage added to the virtual machine in Steps 246-250. The free resources of the system may be updated in any manner now known or later developed. Further, Step 252 may be performed constantly. That is, the system may constantly monitor and update the free resources of the system and the invention should not be limited to the specific order shown in FIGS. 2A-2E.

In Step 254, a determination is made if the resource requirements of the virtual machine have been satisfied. If the requirements have been satisfied, then the method ends. If the requirements have not been satisfied, the method proceeds to Step 256.

In Step 256, a determination is made whether there are resource groups remaining on the list. If there are resource groups remaining, the method returns to Step 236. If there are no remaining resource groups on the list, the method proceeds to Step 258 of FIG. 2E.

Figure 2E:
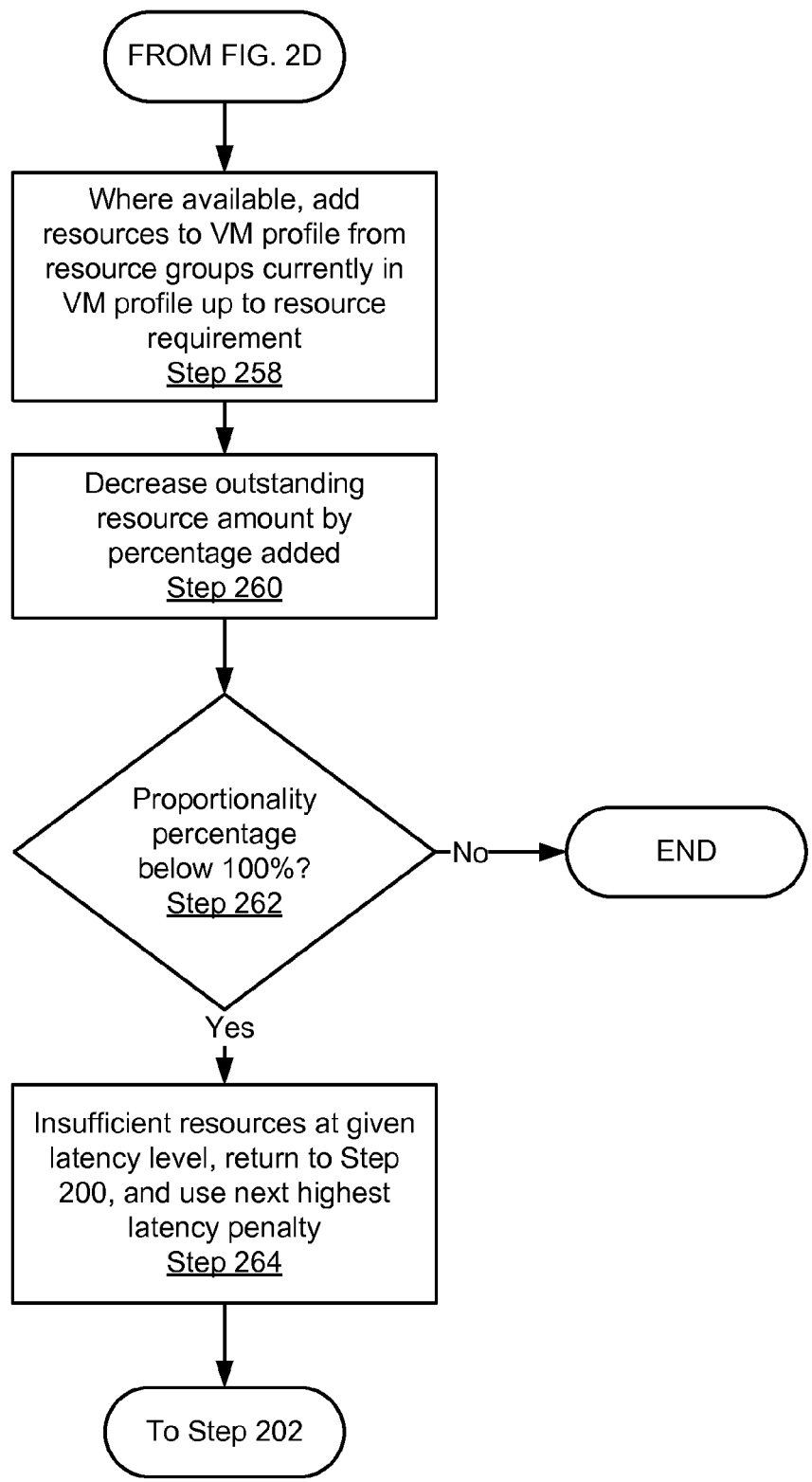

Turning to FIG. 2E, in Step 258, resources, if available, are added to the virtual machine from resource groups that are currently assigned to the virtual machine Step 258 is performed as a last check before resorting to using resources from a higher latency level.

In Step 260, the resource requirements of the virtual machine are reduced by the amount(s) added in Step 258 (if any). The requirements may be reduced by any method now known or later developed.

In Step 262, it is determined if the proportional percentage is below 100%. If the percentage is at or above 100%, then the method ends. If the percentage is below 100%, the method proceeds to Step 264.

In Step 264, the method returns to Step 202, and uses a higher latency grouping than was previously used. Specifically, Step 264 occurs when there are insufficient resources at the given latency level, thus requiring the use of a slower grouping of resources to satisfying the requirements of the virtual machine.

In one or more embodiments of the invention, the method described above may also be used to remove resources from a running virtual machine. The method for removing resources is substantially the same as described above for adding resources. However, when removing resources from a virtual machine, the lowest performance resources are removed first. That is, the resources with the highest latency are removed first. Specifically, the list of resource groups the virtual machine uses is sorted from highest latency to lowest latency, and sub sorted by percentage contribution to the total resources of the virtual machine from lowest to highest. Then, resources are removed in the order on the list until the desired amount of resources have been removed. It will be apparent to one of ordinary skill in the art that removing resources is essentially the opposite of the method described in FIGS. 2A-2E and, as such, the invention should not be limited to the above example.

In one or more embodiments of the invention, multiple virtual machines may be assigned resources concurrently. If this situation occurs, the virtual machines are sorted from highest memory requirement to lowest, and memory is allocated for the highest memory requirement virtual machine first, then CPUs are allocated for the highest memory requirement virtual machine. Then, the next highest memory requirement virtual machine is allocated resources. By assigning resources to the largest virtual machine first, the resources of the system may be allocated in the best manner more easily. It will be apparent to one of ordinary skill in the art that there are many ways to assign resources to multiple virtual machines at a time and, as such, the invention should not be limited to the above example.

The following section describes various examples of the invention. The examples are included to aid in the understanding of the invention and are not intended to limit the scope of the invention.

Figure 3A:
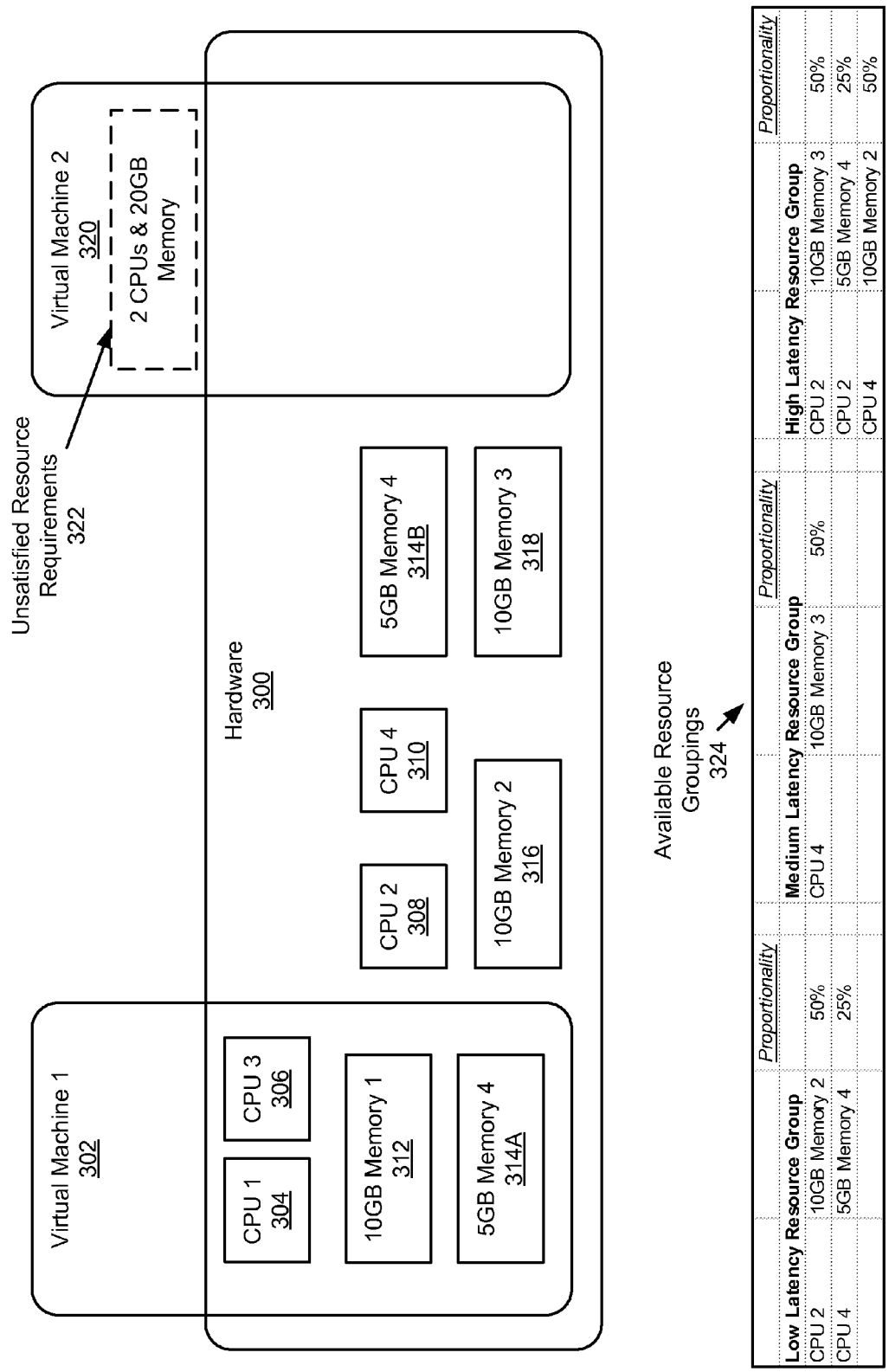
FIGS. 3A-3D show an example in accordance with one or more embodiments of the invention.

FIGS. 3A-3D show an example of specifying the layout of computing system resources. Specifically, FIG. 3A shows an example computing system with Hardware (300), on which one virtual machine is already running (i.e., Virtual Machine 1 (302)), and on which a second virtual machine has requested resources (i.e., Virtual Machine 2 (320)). Specifically, for the purposes of this example, Hardware (300) is setup like Hardware (105) in FIG. 1B. Thus, CPU 1 (304) and CPU 2 (308) are on the same CPU board, while CPU 3 (306) and CPU 4 (310) are on a separate CPU board.

Hardware (300) has various resources, as shown in FIG. 3A, CPU 2 (308), CPU 4 (310), 5 GB Memory 4 (314B), 10 GB Memory 2 (316), and 10 GB Memory 3 (318) are free resources of Hardware (300), as they are depicted outside of the virtual machines (e.g., Virtual Machine 1 (302) and Virtual Machine 2 (320)). CPU 1 (304), CPU 3 (306), 10 GB Memory 1 (312), and 5 GB Memory 4 (314A) are already allocated to Virtual Machine 1 (302). Virtual Machine 2 (320), on the other hand, has no resources allocated, and instead has Unsatisfied Resource Requirements (322) which identifies that Virtual Machine 2 (320) presently needs 2 CPUs and 20 GB of memory.

Available Resource Groupings (324) shows the available resource groupings, their respective latency categories and proportionalities. Specifically, the Low Latency Resource Group includes two CPU-Memory pairings: CPU2 and 10 GB Memory 2 with 50% proportionality (1 CPU available out of 2 CPUs requested=50% proportional percentage, and 10 GB memory out of 20 GB requested=50% proportional percentage; the minimum of the two is 50%, thus 50% proportionality), and CPU4 and 5 GB Memory 4 with 25% proportionality (1 CPU out of 2 CPUs requested=50% proportional percentage, and 5 GB memory out of 20 GB requested=25% proportional percentage; the minimum of the two is 25%, thus 25% proportionality). Medium Latency Resource Group includes one CPU-memory pairing: CPU4 and 10 GB Memory 3 with 50% proportionality (1 CPU out of 2 CPUs requested=50% proportional percentage, and 10 GB memory out of 20 GB requested=50%; the minimum of the two is 50%, thus 50% proportionality), High Latency Resource Group shows three different CPU-Memory pairings: CPU2 and 1.0 GB Memory 3, CPU2 and 5 GB Memory 4, and CPU4 and 10 GB Memory 2. The proportionalities for each of the High Resource Group pairings was calculated in the same way discussed above.

In the following figures, repeated components that do not change will not be discussed multiple times, rather, the discussion will focus on the portions of the example that are changing.

Figure 3B:
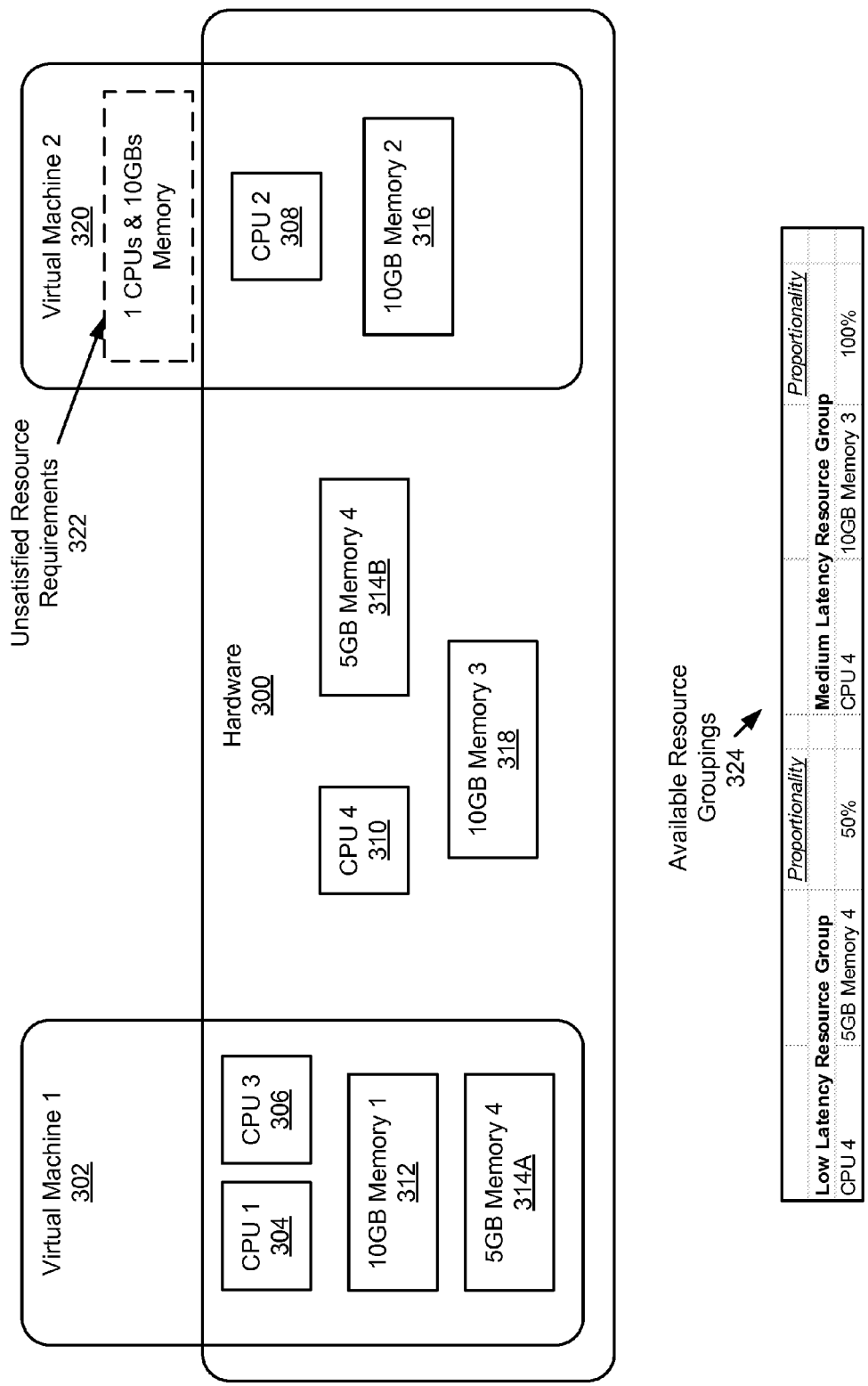

Turning to FIG. 3B, a first resource group has been bound to Virtual Machine 2 (320). Specifically, CPU 2 (308) and 10 GB Memory 2 (316) have been bound, and they have a proportionality of 50% (as shown in Available Resource Groupings (324) in FIG. 3A). Thus, Unsatisfied Resource Requirements (322) have been updated, and now show that only 1 CPU and 10 GB memory are required. Likewise, Available Resource Groupings (324) have also been updated, by removing CPU 2 (308) and 10 GB Memory 2 (316), and updating the proportionality of the remaining CPU-Memory pairs, since the amount of resources needed by Virtual Machine 2 (320) has decreased.

Figure 3C:
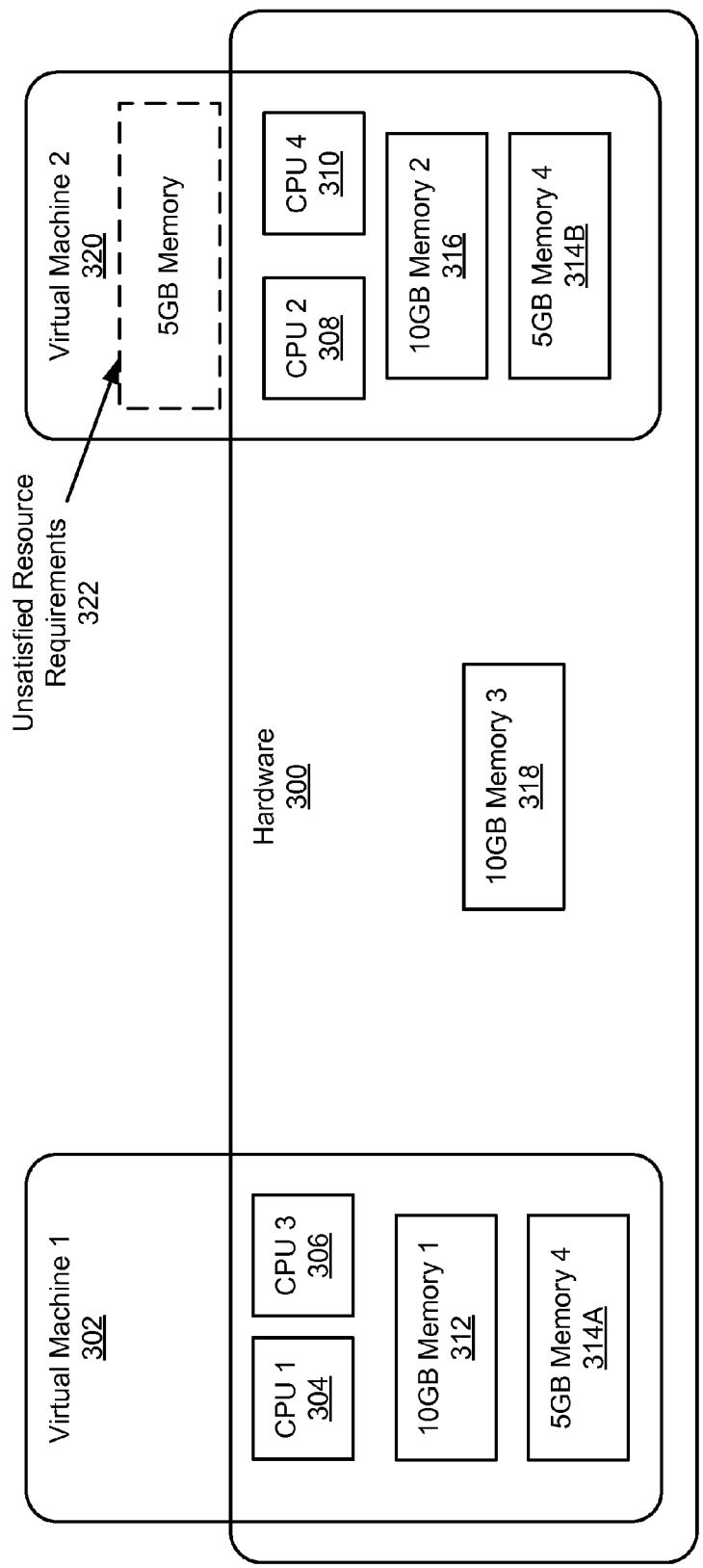
Figure 3D:
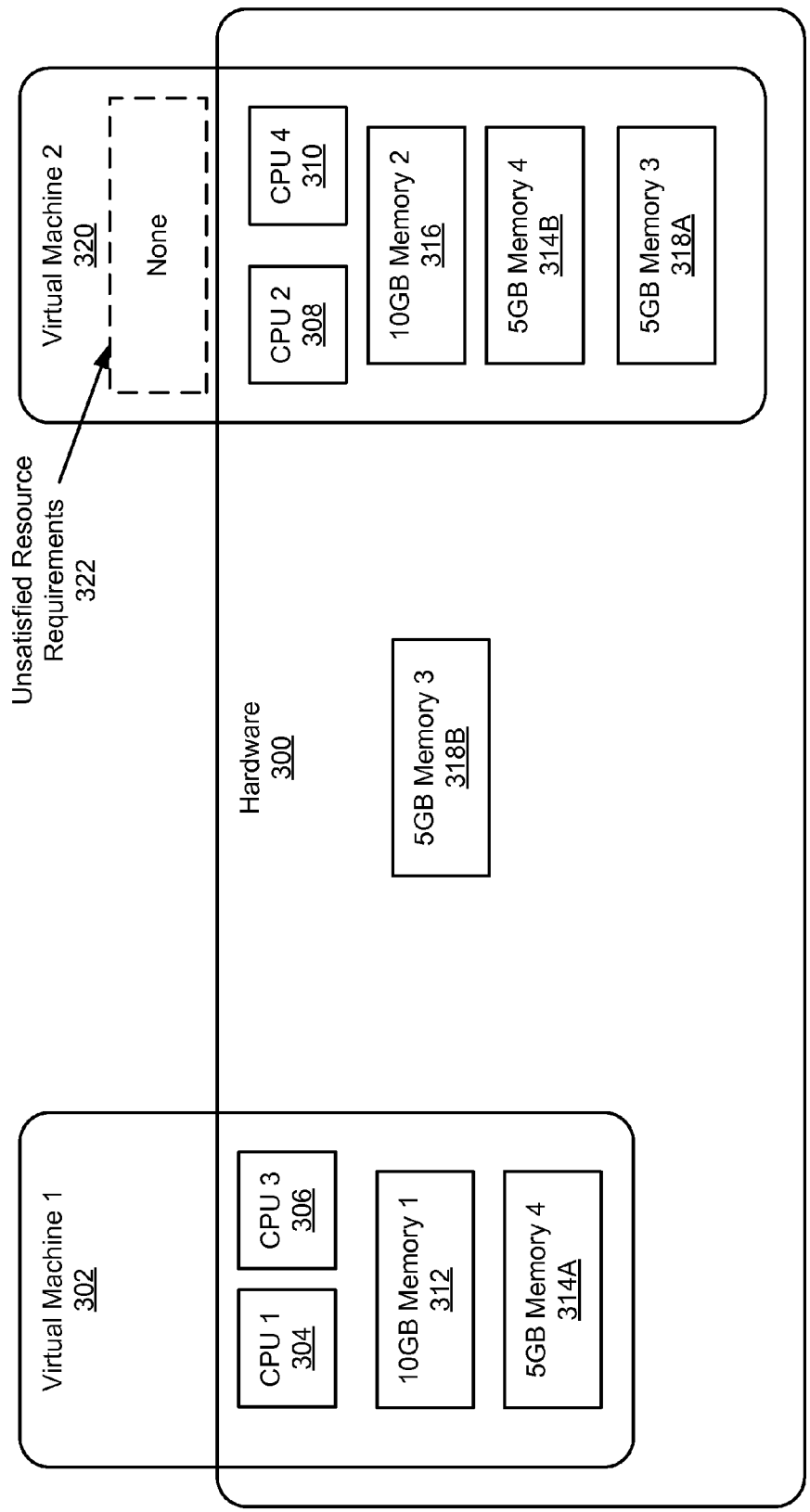

Next, the example continues to FIG. 3C, where a second resource group has been bound to Virtual Machine 2 (320). Specifically, CPU 4 (310) and SGB Memory 4 (314B) have been bound, and they have a proportionality of 50%, as shown in Available Resource Groupings (324) in FIG. 3B. Thus, Unsatisfied Resource Requirements (322) have been updated, and now only SGB of memory are needed to satisfying the requirements of Virtual Machine 2 (320). For the sake of simplicity, FIG. 3C does not show an available resource groupings, even though 10 GB Memory 3 (318) is still available. Because 10 GB Memory 3 (318) is the only available memory left from Hardware (300), it must be used to satisfy the remaining requirements of Virtual Machine 2 (320). Thus, in FIG. 3D, SGB Memory 3 (318A) has been assigned to Virtual Machine 2 (320), and the Unsatisfied Resource Requirements (322) have been updated, and show that all resources have been satisfied. Further, Hardware (300) now only has SGB Memory 3 (318B) remaining as a free resource.

Figure 4:
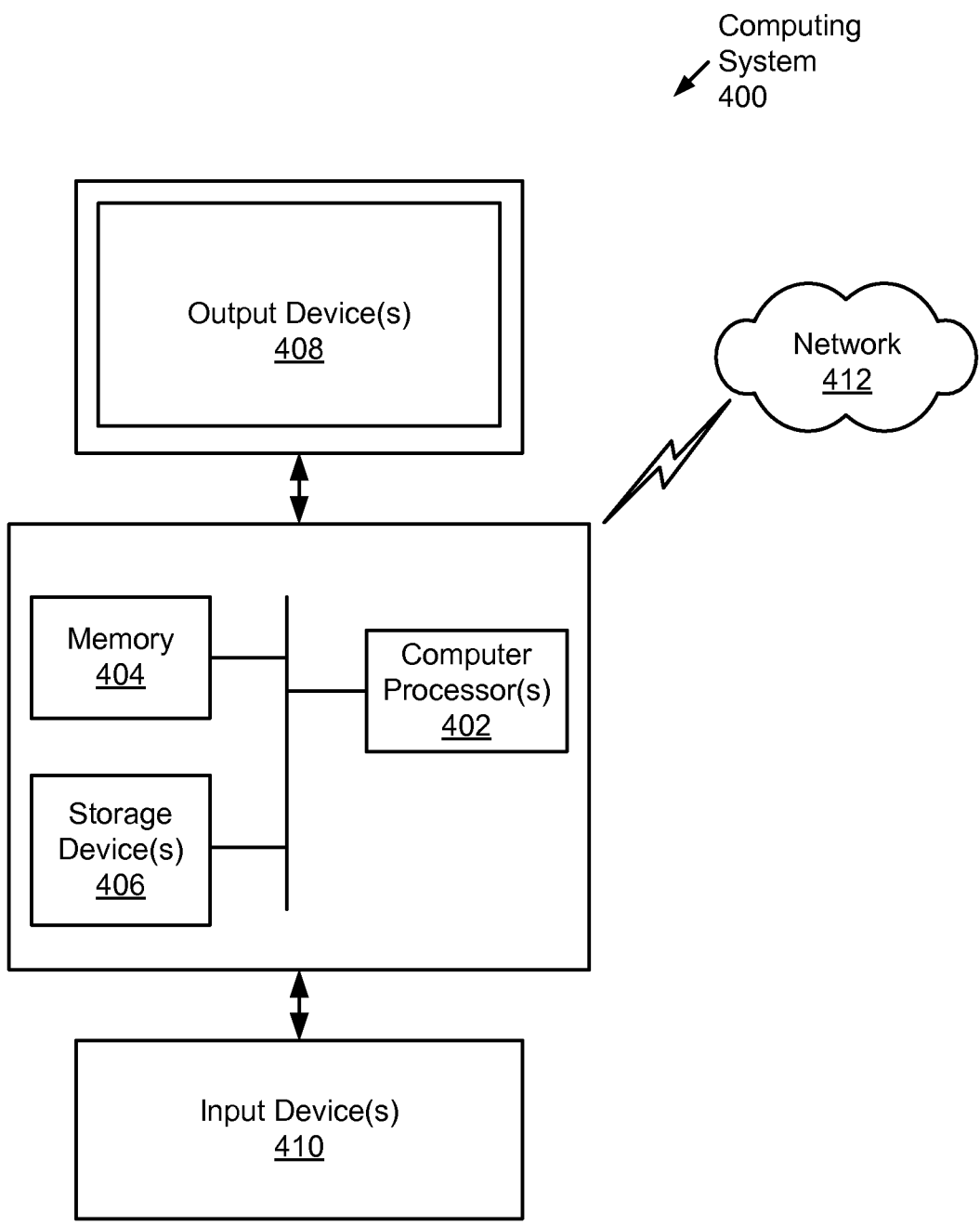
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for specifying a layout of computing system resources, comprising:

receiving, by a computer processor, a request for a virtual machine, the request comprising a processor requirement and a memory requirement;

identifying, by the computer processor, a plurality of resource groupings, each resource grouping of the plurality of resource groupings comprising a latency penalty between a first processor, of a plurality of processors, and at least a first memory of a plurality of memories;

determining a first fractional amount of the processor requirement that the resource grouping can satisfy and a second fractional amount of the memory requirement that the resource grouping can satisfy;

calculating, by the computer processor, a proportionality for each resource grouping of the plurality of resource groupings, wherein calculating the proportionality comprises comparing the first fractional amount and the second fractional amount to identify a minimum;

sorting, by the computer processor, the plurality of resource groupings based on at least the proportionality for each resource grouping to create a first ordered list;

allocating, by the computer processor and based on the first ordered list, at least one resource group of the plurality of resource groupings to the virtual machine, wherein the at least one resource group satisfies the processor requirement and the memory requirement; and executing, subsequent to the allocating, the virtual machine on the at least one resource group.

2. The method of claim 1, further comprising:

determining that a first resource grouping on the first ordered list exceeds the processor requirement and the memory requirement;

determining that a second resource grouping on the first ordered list exceeds the processor requirement and the memory requirement, wherein the second resource grouping is after the first resource grouping on the first ordered list; and binding the second resource group to the virtual machine to satisfy the processor requirement and memory requirement.

3. The method of claim 1, further comprising:

determining, after binding the at least one resource group, that the at least one resource group and the plurality of resource groupings are unable to satisfy the processor requirement and the memory requirement; and sorting the plurality of resource groupings based on at least the proportionality for each resource grouping to create a second ordered list, each resource grouping of the second ordered list having a larger latency penalty than each resource grouping of the first ordered list; and binding, by the computer processor and based on the second ordered list, at least one resource group of the plurality of resource groupings to the virtual machine, wherein the at least one resource group satisfies the processor requirement and the memory requirement.

4. The method of claim 1, wherein the latency penalty comprises one selected from a group consisting of: a low latency group, a medium latency group, and a high latency group.

5. The method of claim 4, wherein the low latency group comprises at least a second processor of the plurality of processors accessing a second memory of the plurality of memories, wherein the second processor and the second memory are located on a single node.

6. The method of claim 1, further comprising:
  determining that the virtual machine is already executing, wherein the virtual machine comprises a bound resource; and
  restoring proportionality to the bound resource.

7. The method of claim 1, wherein the first ordered list is further sub-sorted by a physical resource identification number, and wherein binding comprises binding a portion of the resource group.

8. A non-transitory computer-readable medium (CRM) storing a plurality of instructions for specifying a layout of computing system resources, the plurality of instructions comprising functionality for:
  receiving a request for a virtual machine, the request comprising a processor requirement and a memory requirement;
  identifying a plurality of resource groupings each resource grouping of the plurality of resource grouping comprising a latency penalty between a first processor, of a plurality of processors, and at least a first memory of a plurality of memories;
  determining a first fractional amount of the processor requirement that the resource grouping can satisfy and a second fractional amount of the memory requirement that the resource grouping can satisfy;
  calculating a proportionality for each resource grouping of the plurality of resource groupings, wherein calculating the proportionality comprises comparing the first fractional amount and the second fractional amount to identify a minimum;
  sorting the plurality of resource groupings based on at least the proportionality for each resource grouping to create a first ordered list;
  allocating, based on the first ordered list, at least one resource group of the plurality of resource groupings to the virtual machine, wherein the at least one resource group satisfies the processor requirement and the memory requirement; and
  executing, subsequent to the allocating, the virtual machine on the at least one resource group.

9. The non-transitory CRM of claim 8, the plurality of instructions comprising further functionality for:
  determining that a first resource grouping on the first ordered list exceeds the processor requirement and the memory requirement;
  determining that a second resource grouping on the first ordered list exceeds the processor requirement and the memory requirement, wherein the second resource grouping is after the first resource grouping on the first ordered list; and
  binding the second resource group to the virtual machine to satisfy the processor requirement and memory requirement.

10. The non-transitory CRM of claim 8, the plurality of instructions comprising further functionality for:
  determining, after binding the at least one resource group, that the at least one resource group and the plurality of resource groupings are unable to satisfy the processor requirement and the memory requirement; and
  sorting the plurality of resource groupings based on at least the proportionality for each resource grouping to create a second ordered list, each resource grouping of the second ordered list having a larger latency penalty than each resource grouping of the first ordered list; and
  binding, by the computer processor and based on the second ordered list, at least one resource group of the plurality of resource groupings to the virtual machine, wherein the at least one resource group satisfies the processor requirement and the memory requirement.

11. The non-transitory CRM of claim 8, wherein the latency penalty comprises one selected from a group consisting of: a low latency group, a medium latency group, and a high latency group.

12. The non-transitory CRM of claim 11, wherein the low latency group comprises at least a second processor of the plurality of processors accessing a second memory of the plurality of memories, wherein the second processor and the second memory are located on a single node.

13. The non-transitory CRM of claim 8, the plurality of instructions comprising further functionality for:
  determining that the virtual machine is already executing, wherein the virtual machine comprises a bound resource; and
  restoring proportionality to the bound resource.

14. The non-transitory CRM of claim 8, wherein the first ordered list is further sub-sorted by a physical resource identification number, and wherein binding comprising binding a portion of the resource group.

15. A system for specifying a layout of computing system resources, comprising:
  a computing system comprising a plurality of processors and a plurality of memories, the computing system configured for:
    receiving a request for a virtual machine, the request comprising a processor requirement and a memory requirement;
    identifying a plurality of resource groupings, each resource grouping of the plurality of resource groupings comprising a latency penalty between a first processor, of a plurality of processors, and at least a first memory of a plurality of memories;
    determining a first fractional amount of the processor requirement that the resource grouping can satisfy and a second fractional amount of the memory requirement that the resource grouping can satisfy;
    calculating a proportionality for each resource grouping of the plurality of resource groupings, wherein calculating the proportionality comprises comparing the first fractional amount and the second fractional amount to identify a minimum;
    sorting the plurality of resource groupings based on at least the proportionality for each resource grouping to create a first ordered list;
    allocating, based on the first ordered list, at least one resource group of the plurality of resource groupings to the virtual machine, wherein the at least one resource group satisfies the processor requirement and the memory requirement.

16. The system of claim 15, further comprising functionality for:
  determining that a first resource grouping on the first ordered list exceeds the processor requirement and the memory requirement;
  determining that a second resource grouping on the first ordered list exceeds the processor requirement and the memory requirement, wherein the second resource grouping is after the first resource grouping on the first ordered list; and
  binding the second resource group to the virtual machine to satisfy the processor requirement and memory requirement.

17. The system of claim 15, further comprising functionality for:

determining, after binding the at least one resource group, that the at least one resource group and the plurality of resource groupings are unable to satisfy the processor requirement and the memory requirement; and sorting the plurality of resource groupings based on at least the proportionality for each resource grouping to create a second ordered list, each resource grouping of the second ordered list having a larger latency penalty than each resource grouping of the first ordered list; and binding, by the computer processor and based on the second ordered list, at least one resource group of the plurality of resource groupings to the virtual machine, wherein the at least one resource group satisfies the processor requirement and the memory requirement.

18. The system of claim 15, wherein the latency penalty comprises one selected from a group consisting of: a low latency group, a medium latency group, and a high latency group, and wherein the low latency group comprises at least a second processor of the plurality of processors accessing a second memory of the plurality of memories, wherein the second processor and the second memory are located on a single node.

19. The system of claim 15, further comprising:

determining that the virtual machine is already executing, wherein the virtual machine comprises a bound resource; and restoring proportionality to the bound resource.

20. The system of claim 15, wherein the first ordered list is further sub-sorted by a physical resource identification number, and wherein binding further comprises binding a portion of the resource group.

\* \* \* \* \*